A. J. PERRON.

SPARK PLUG.

APPLICATION FILED JUNE 11, 1920.

Reissued Sept. 14, 1920. 14,949.

Witness:
John Enders

Inventor:
Alexander Joseph Perron
by Fred Gerlach
his Atty.

UNITED STATES PATENT OFFICE.

ALEXANDER JOSEPH PERRON, OF SPARTA, WISCONSIN.

SPARK-PLUG.

14,949. Specification of Reissued Letters Patent. Reissued Sept. 14, 1920.

Original No. 1,308,107, dated July 1, 1919, Serial No. 249,888, filed August 14, 1918. Application for reissue filed June 11, 1920. Serial No. 388,344.

*To all whom it may concern:*

Be it known that I, ALEXANDER JOSEPH PERRON, a citizen of the United States, and a resident of Sparta, in the county of Monroe and State of Wisconsin, have made certain new and useful Improvements in Spark-Plugs, of which the following is a specification.

My invention relates to improvements in spark plugs, and it consists in the construction, combination and arrangement of the parts, substantially as herein described and claimed.

An object of my invention is to provide a spark plug having an almost entirely closed shell for the purpose of protecting the central electrode, the floor of the shell being disposed at an angle to cause any possible accumulation of oil in the shell, to run to the drip point beneath the electrode, thus keeping the interior of the shell clean.

Another object of the invention is to provide a spark plug including a shell which is entirely closed with the exception of a single electrode slot into which the point of the central electrode extends to provide the spark gap, the central electrode and a portion of the porcelain being made square to prevent turning and disalining the point of the central electrode in screwing the packing nut down.

A further object of the invention is to provide a spark plug having the features hereinbefore described, and including a mark whereby the location of the electrode slot may be determined, for purposes of positioning the spark gap.

Other objects and advantages will appear in the following specification, reference being had to the accompanying drawing in which:—

One of the important features of the spark plug lies in the construction of the metal shell 1, which, when the parts of the spark plug are assembled is entirely closed on the bottom with the exception of a single narrow electrode slot 2.

Figure 1:
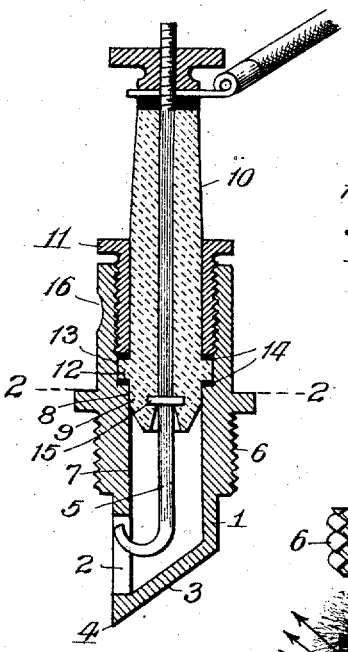
Figure 1 is a vertical section of the improved spark plug.
Figure 4:
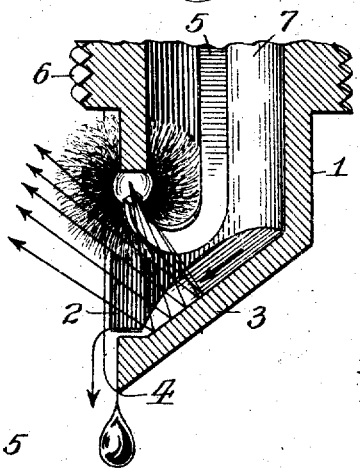
Fig. 4 is a detail sectional perspective view illustrating how the inclined floor acts as a reflector.

The floor 3 of the shell 1 is disposed at an angle as clearly shown in Figs. 1 and 4, in order to cause the drainage of any such substance as oil toward the drip point 4 where the drop forms as shown in Fig. 4. In the first place, by almost entirely closing the shell 1, the filling of the spark plug around the central electrode 5 by means of oil, carbon and gas is almost entirely prevented.

Any oil that may find its way into the shell 1 through the slot 2 will quickly run out because it cannot stand on the inclined floor 3. The shell 1 has a threaded body 6 by means of which the spark plug is screwed into the head of an engine.

Figure 2:
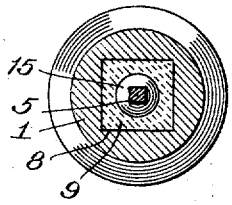
Fig. 2 is a cross section on the line 2—2 of Fig. 1.
Figure 3:
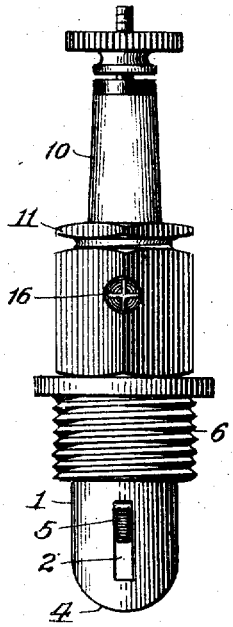
Fig. 3 is a front elevation of the spark plug.
Figure 5:
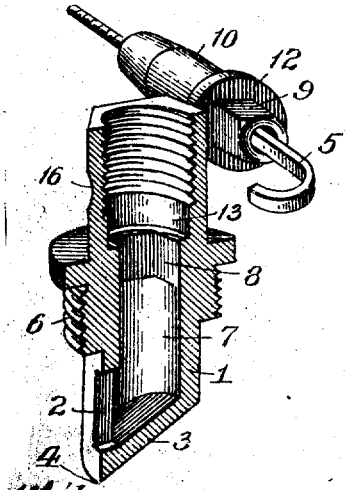
Fig. 5 is a detail perspective view showing the core and the shell of the spark plug separated, the shell being shown in section.

The shell 1 has a bore of a number of diameters. The bore 7 which constitutes the electrode chamber, ends in flat walls 8 which form a square portion that is clearly shown in Figs. 2 and 5. The corresponding square end 9 of the porcelain core 10, fits in the square portion 8 and prevents the turning of the porcelain core and the disalining of the spark point of the central electrode, when the packing nut 11 is screwed down.

A boss 12 on the porcelain core fits in the counterbore 13 of the shell 1. This counterbore is threaded and receives the packing nut 11. Gaskets 14 are located on the upper and lower sides of the boss 12 and are intended to form a tight joint when the nut is screwed down.

The central electrode 5 is square in cross section so that it cannot turn in the porcelain core 10. A collar 15 on the electrode prevents it from dropping out. The collar is molded in the core as shown. The spark point of the central electrode is at the end which is curved around and spaced the proper distance from the head of the electrode slot 2 where it forms the spark gap.

It will be observed at once that the purpose of the coöperating square end 9 of the core and the square portion 8 of the shell is to keep the spark point of the central electrode in the true position at the head of the electrode slot and prevent the disalinement of the spark point when the packing nut 11 is screwed down.

In order that the location of the spark gap may be ascertained by simply looking at the plug when it is in position in the engine cylinder, a suitable mark 16 is made on the exposed part of the shell directly in line with the electrode slot 2. Besides serving to drain the shell of oil, the inclined floor 3 acts as a reflector to the force of the explosion. This feature is illustrated in Fig. 4 by the arrows. The gas created by the explosion is made to sweep back out of the electrode slot 2 and across the spark point of the electrode, thereby clearing the slot and tending to keep the spark point clean.

Figure 6:
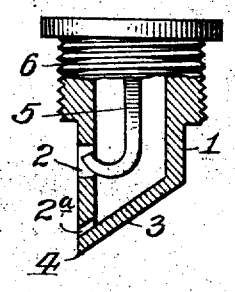
Fig. 6 is a detail sectional view illustrating a slight modification.

The modification in Fig. 6 consists simply of providing a minute drain hole $2^a$ in alinement with the inclined floor 3. In this case the electrode slot 2 is made just large enough to accommodate the spark point of the central electrode. In this form of the invention it will be observed that the shell 1 is closed to even a greater extent than is the case in Fig. 1; it is the purpose of the invention to inclose the central electrode as much as possible for the purpose of protection.

Figure 7:
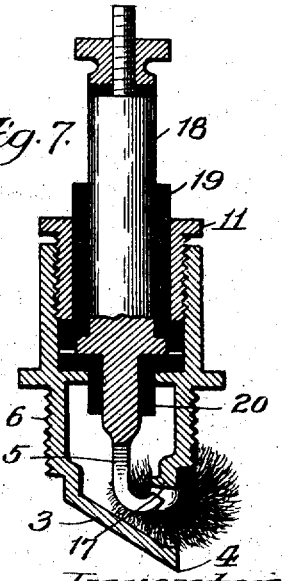
Fig. 7 is a sectional view of a spark plug constructed substantially like the one in Fig. 1, but showing a modified structure in the core and the mounting therefor.

The modification in Fig. 7 embodies the important elements of the invention, *i. e.*, the construction of the shell 1, a slight departure being made in the construction of the electrodes in that a fixed electrode 17 is formed at the head of the electrode slot. This formation enables the location of the spark point of the central electrode 5 even farther inside of the shell.

In this form of the invention, the central electrode forms a part of the central metallic core 18, which is of the same general appearance of the porcelain core 10. A sleeve 19 and a bushing 20 of insulating and heat resisting material, supports the metallic core 18 in the shell of the spark plug.

The invention exemplifies a spark plug in which the shell containing the central electrode is closed, except for a hole or slot in its side, so as to exclude substances from the interior of the shell around the electrode.

While the construction and arrangement of the spark plug herein described and illustrated is that of a generally preferred form, obviously slight modifications and changes may be made without departing from the spirit of the invention or the scope of the claims.

Having thus described the invention, what I claim as new and desire to secure by Letters Patent, is:

1. A spark plug comprising a shell having an annular wall with a hole in its side and a closed bottom and substantially closed except for said hole to exclude substances from the interior of the shell, and a central electrode contained in and insulated from said shell, having a terminal to form a spark gap between the shell and the electrode.

2. A spark plug comprising a shell having a cylindrical wall with a vertically extending hole in its side and a closed bottom, and a central electrode within the shell, having a terminal to form a spark gap adjacent said opening, the shell being substantially closed around the electrode except for said hole to exclude substances from the interior of the shell.

3. In a spark plug, the combination of a shell provided with an annular wall having an electrode hole therein and a closed bottom whereby substances will be excluded from the interior of the shell, a central electrode in the shell having a terminal extended to form a spark gap adjacent the hole, an insulating sleeve in which the electrode is secured, and an interfitting connection between the core and the shell whereby they will be secured against relative rotation and be kept in correct operative relation.

4. A spark plug, comprising a central electrode, and a shell having an electrode slot for receiving the point of said electrode to form the spark gap, said shell being entirely closed with the exception of said slot for the protection of said electrode and the exclusion of substances from the interior of the shell, and having an inclined floor acting as a reflector to expel the gas and clear said slot and spark point.

5. A spark plug, comprising a central electrode and a shell having an electrode slot for receiving the point of said electrode to form the spark gap, said shell being entirely closed with the exception of said slot for the protection of said electrode, and being provided with a floor inclined upwardly from the base of said slot, to form an oil drip point below said slot and to insure the drainage of the spark plug.

6. In a spark plug, a shell having a relatively narrow and vertically disposed electrode slot, said shell being entirely closed with the exception of said slot and being provided with a non-circular portion in the bore of the shell, a central electrode of non-circular cross section having the point turned into the electrode slot to form the spark gap, and an insulating core having said electrode embedded therein and provided with a non-circular end to fit in said non-circular portion and prevent the disalinement of the spark point in the electrode slot in assembling the parts of the spark plug.

7. In a spark plug, a shell having a vertically disposed electrode slot and a floor slanting up from the base of said slot to drain the shell of oil to a drip point below the slot, the bore of said shell having a non-circular portion and the exterior of the shell having a mark in vertical alinement with the electrode slot for the determination of the spark gap when the plug is in place in a cylinder, a central electrode of non-circular cross section having the point turned into said slot to form the spark gap, an insulating core having the electrode embedded therein, the electrode having a collar to prevent it from dropping out, said core including a non-circular end fitting in said non-circular portion of the shell to prevent turning of the core and the disalinement of the spark point in said slot, and a packing nut arranged to bind said core in place.

8. A spark plug, comprising a shell having an electrode slot forming a drain opening, the shell having a floor slanting upwardly from said opening to cause fluid to run down to said opening, and being entirely closed with the exception of said slot, and a central electrode having a spark point turned toward the top of the slot to form the spark gap.

ALEXANDER JOSEPH PERRON.